United States Patent [19]
Seino et al.

[11] Patent Number: 5,680,497
[45] Date of Patent: *Oct. 21, 1997

[54] OPTICAL WAVEGUIDE DEVICE

[75] Inventors: Minoru Seino; Tadao Nakazawa; Takashi Yamane; Yoshinobu Kubota; Masaharu Doi; Kunio Sugeta; Teruo Kurahashi, all of Kawasaki, Japan

[73] Assignee: Fujitsu Limited, Kawasaki, Japan

[*] Notice: The term of this patent shall not extend beyond the expiration date of Pat. No. 5,404,412.

[21] Appl. No.: 350,894

[22] Filed: Dec. 7, 1994

Related U.S. Application Data

[62] Division of Ser. No. 996,684, Dec. 24, 1992, Pat. No. 5,404,412.

[30] Foreign Application Priority Data

Dec. 27, 1991 [JP] Japan .................... 3-346147

[51] Int. Cl.⁶ .................................................. G02B 6/10
[52] U.S. Cl. ............................ 385/129; 385/2; 385/8
[58] Field of Search ............................ 385/2, 129, 130, 385/8

[56] References Cited

U.S. PATENT DOCUMENTS 5,153,934  10/1992  Okayama et al. ............... 385/8
5,214,724   5/1993  Seino et al. ................... 385/8

Primary Examiner—Rodney B. Bovernick
Assistant Examiner—Robert E. Wise
Attorney, Agent, or Firm—Armstrong, Westerman, Hattori, McLeland & Naughton

[57] ABSTRACT

This invention aims at providing an optical waveguide device capable of stably operating for an extended period of time. The optical waveguide device comprises an optical waveguide path formed inside a surface of an electro-optical substrate, a buffer layer formed on the optical waveguide path, and a driving electrode for impressing an electric field so as to change a refractive index of the optical waveguide path, wherein the buffer layer is made of a transparent dielectric or insulator of a mixture between silicon dioxide and an oxide of at least one element selected from the group consisting of the metal elements of the Groups III to VIII, Ib and IIb of the Periodic Table and semiconductor elements other than silicon, or a transparent dielectric or insulator of an oxide between silicon and at least one of the metal elements and semiconductor elements described above.

13 Claims, 16 Drawing Sheets

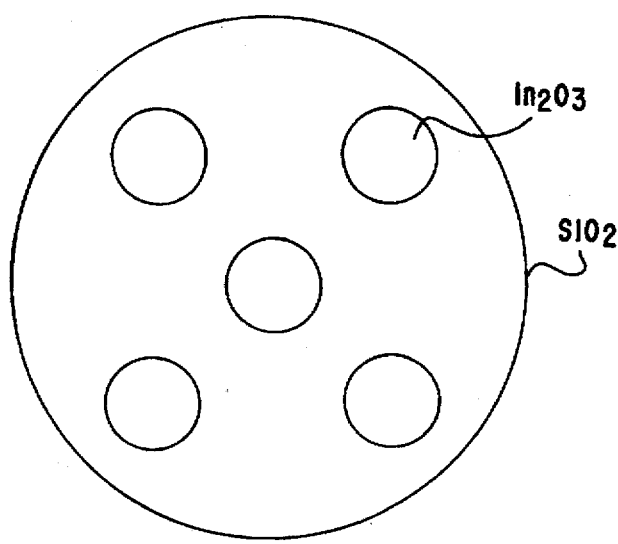
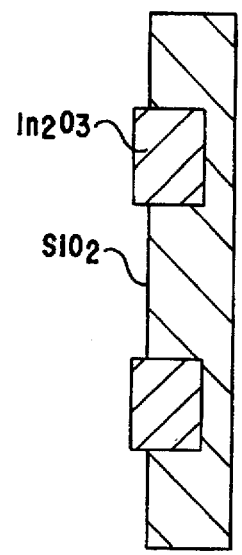
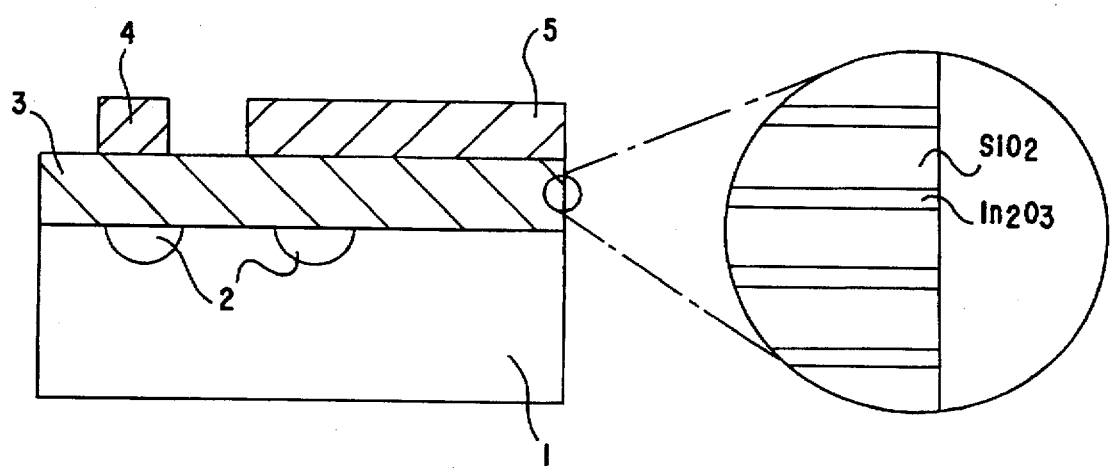

OPTICAL WAVEGUIDE DEVICE

This is a division of application Ser. No. 07/996,684 filed Dec. 24, 1992, now U.S. Pat. No. 5,404,412.

BACKGROUND OF THE INVENTION

1. Field of the Invention

This invention generally relates to an optical waveguide device. More particularly, it relates to a structure of an optical waveguide device in an optical communication system for which particularly high reliability is required, and having a structure that will be used for a high speed optical switch for exchanging multi-channel large capacity data in optical form or will be used for an optical external modulator for ultra-high speed ultra-distance communication, and which improves stability of the modulator and switch for an extended period of time.

2. Description of the Related Art

In ordinary optical waveguide devices used for optical switches and optical modulators, an electric field is applied to an optical waveguide path formed inside a surface of an electro-optical crystal substrate such as lithium niobate ($LiNbO_3$) so as to change the refractive index of this optical waveguide path. In this way, the switching of optical signals travelling inside the waveguide path, and their phase modulation and intensity modulation are carried out.

In such waveguide devices, a buffer layer of a transparent dielectric film having a smaller refractive index than that of the waveguide path is sandwiched between the waveguide path and the electrode so as to prevent light propagating through the waveguide path from being absorbed by the electrode metal. When an electrode is formed on this buffer layer and a voltage is applied to the electrode, an electric field is applied to the waveguide path formed in the substrate crystal and the refractive index of the waveguide path changes in proportion to the intensity of the electric field. Thus, functions such as switching and modulation are provided.

In this case, the intensity of the electric field applied to the waveguide path and its change with time are greatly affected by characteristics of the buffer layer. Since the optical output changes in proportion to the refractive index of the waveguide path, that is, in proportion to the intensity of the electric field applied to the waveguide path, a technique for accurately controlling the electric field applied to the waveguide path is very important in devices of this kind.

The waveguide devices using such an electro-optical crystal substrate include optical switches, modulators, branching filters, polarized wave controllers, and so forth, but for the safe of convenience the following explanation will be for a Mach-Zehnder type optical modulator using a $LiNbO_3$ waveguide path for use in a ultra-high speed optical communication modulator.

FIG. 23 shows the appearance of a conventional Mach-Zehnder type modulator. In the drawing, reference numeral 1 denotes a lithium niobate ($LiNbO_3$) crystal substrate that is cut in such a manner that an X axis of the crystal axis extends in a longitudinal direction of a chip, a Z axis extends in the direction of thickness so as to use an electro-optical coefficient $x_{33}$ and a Y axis extends in the direction perpendicular to the X and Z axes. A semi-circular optical waveguide path 2 having a greater refractive index than that of the substrate 1 and having a diameter of about 7 µm is formed on a surface of the substrate 1 by first forming a metal titanium (Ti) film by a known film formation means, such as electron beam deposition, then patterning this titanium (Ti) deposition film into a belt-like form in an X direction shown in the drawing, and thermally diffusing titanium into the substrate 1.

Next, in order to prevent absorption of light propagating through the optical waveguide path 2 by the electrode, silicon dioxide ($SiO_2$) having a specific dielectric constant of 4.0 and a refractive index of about 1.45 is deposited to a thickness of 0.5 µm over the entire surface of the waveguide substrate 1 by a film formation technique, such as electron beam deposition, thereby forming a buffer layer. (To facilitate an understanding, the optical waveguide path 2 is shown as if it existed on the surface of the buffer layer 3 in FIG. 23.) Furthermore, a signal electrode 4 and a ground electrode 5 consisting of a thin gold (Au) film having a width of 7 µm and a thickness of 10 µm, for example, are formed by vacuum deposition and plating at positions on the surface of the buffer layer 3 corresponding to the optical waveguide path 2. A travelling wave electrode and a signal source 6 are connected by a coaxial cable 7. Similarly, a terminal resistor 8 is connected by the coaxial cable 7. A lithium niobate crystal block 9 is bonded to the end surface of the optical waveguide path 2, and the waveguide path is connected to a fiber 11 by a fiber fixing jig 10.

FIG. 24A shows a sectional structure on a cut line in the modulator shown in FIG. 23. In terms of an electrical equivalent circuit, this section can be expressed, as shown in FIG. 24B, by a buffer layer resistance $R_b$, the resistance $R_{LN}$ of the lithium niobate crystal and their capacitances $C_B$ and $C_{LN}$. In this equivalent circuit, the voltage $V_{LN}$ applied to lithium niobate is substantially determined by the capacitance C alone in the equivalent circuit at the instant of the application of voltage to the electrodes 4 and 5, and has a voltage value given by the following equation (1):

$$V_{LN} = \frac{C_B}{C_B + 2C_{LN}} \quad (1)$$

After the passage of a sufficient period of time, $V_{LN}$ is substantially determined by the resistance R in the equivalent circuit, and is given by the following equation (2):

$$V_{LN} = \frac{R_{LN}}{R_{LN} + 2R_B} V \quad (2)$$

Accordingly, the voltage applied to the waveguide path changes between the instant of the application of voltage to the electrodes of the modulator and after the passage of sufficient time. In consequence, the outgoing light from the modulator also changes, which change is referred to as a "DC drift" in lithium niobate waveguide devices.

FIG. 25 is a diagram showing the relation between the impressed voltage and the intensity of outgoing light. In the diagram, when a voltage $V_1$ is applied, there is an optical output $P_1$ at the instant of the application, but this optical output decreases with time. Assuming that the optical output reaches $P_1$, this state is equivalent to the state where only a voltage $V_2$ is effectively applied to the electrodes, and this drift quantity S can be evaluated by the following equation (3):

$$S = (V_1 - V_2)/V_1 \quad (3)$$

This DC drift is the phenomenon that is generated by the DC component of the voltage applied to the electrodes, and is proportional to the degree of the impressed voltage. In other words, assuming that a 0.3V DC drift occurs when a 1V voltage is applied, the DC drift of 3V occurs when a 10V voltage is applied. It is therefore convenient to express the DC drift quantity by percentage to the impressed voltage when the DC drift is discussed. Accordingly, the DC drift quantity will be expressed by percentage in the following description.

FIG. 26 shows the relation between the resistance R and the capacitance C on the basis of the equations (1) and (2) and the occurrence of the DC drift. When the voltage determined by the resistance of the equation (2) is smaller than the voltage determined by the capacitance of the equation (1), a positive drift occurs and is represented by (a). At this time, the voltage (or the electric field) applied to the waveguide path gradually decreases, and when the voltage determined by the resistance is greater than the voltage determined by the capacitance, a negative drift occurs and is represented by (c). At this time, the voltage (or the electric field) applied to the waveguide path gradually increases. Needless to say, the practical DC drift is not as simple as described above.

Here, the resistance, capacitance, etc., such as the resistance of the interface layer between the $LiNbO_3$ substrate 1 and the buffer layer 3, the resistance of the buffer layer 3 in the horizontal direction, the resistance arising from the difference of the peripheral portion of the optical waveguide path 2 from the substrate 1, etc., are equivalently expressed by $C_B$, $C_{LN}$, $R_B$ and $R_{LN}$. As is known well, the electric resistance of a dielectric (an insulator) changes with the voltage impression time. When mobile ions exist in the buffer layer 3 and in the crystal, a spatial charge distribution owing to their migration must also be taken into consideration. When the DC drift is examined, therefore, these factors must be collectively taken into consideration. However, it is extremely complicated to clarify in detail the mechanisms for all these phenomena and to classify and describe same. Therefore, an explanation will be directed primarily to a method of improving the DC drift characteristics and the characterizing results obtained by such a method.

FIG. 27 shows the evaluation result of the DC drift of the modulator having the prior art structure shown in FIG. 23. FIG. 27 shows the DC drift characteristics changing with time, which are evaluated at atmospheric temperature of 20° C., 60° C., 100° C. and 140° C. It can be appreciated from the diagram that the DC drift is an extremely slow phenomenon occurring at rates of 5% a day at room temperature (20° C.), 30% per 10 days and 100% per 200 days. (In the conventional modulators, too, there is, of course, the case where this phenomenon reaches 100% within several minutes if a process condition is incomplete, such as when there is damage to the crystal.)

Even if the DC drift is such an extremely slow phenomenon, the characteristics of the components for optical communication must be compensated for, for at least a period of 15 years, and the characteristics described above are not sufficient. Furthermore, it is practically difficult to evaluate such a phenomenon in the course of 15 years and then to produce a product, but fortunately, it is known that this phenomenon is accelerated by temperature, as shown in the drawing. In other words, it is known that when evaluation is made at 100° C., the phenomenon can be evaluated in acceleration of 1,000 times at room temperature. It is therefore possible to evaluate and estimate long term characteristics for periods of more than 15 years by carrying out the evaluation at 100° C., and for this reason, the following description will be based on the evaluation result at 100° C. or 140° C. as the reference.

Several methods for improving this DC drift have been proposed in the past. Since the existence of the buffer layer 3 is the main cause for the DC drift as described above, a structure using a transparent electrode for preventing the absorption of propagating light by the electrodes without forming the buffer layer 3 has been proposed (KOKAI (Japanese Unexamined Patent Publication) No. 55-69122). However, there is no material that is transparent at a wavelength of 1.3 μm or 1.55 μm, which is important for optical communication, and that has a sufficiently smaller refractive index than that of the waveguide path. Accordingly, the structure proposed by the reference described above is not disposed immediately above the waveguide path but is disposed in the proximity of the waveguide path, so as to avoid the problem of optical absorption. In practice, there is a device in which the electrodes must be formed immediately on the waveguide path, such as a Z-cut substrate device. As a counter-measure for such a case, (KOKAI (Japanese Unexamined Patent Publication) No. 61-198133), which reduces the optical absorption by mixing an electrically conductive material with a transparent insulator film has been proposed. According to this method, an optical wavelength range, which is effective as a transparent electrode, can assuredly shift to a longer wavelength side compared to the case where the electrically conductive material is used alone.

To retain the function as the electrode, however, the proportion of this electrically conductive material must be increased, but because generally known conductive materials have strong optical absorptivity at a wavelength of 1 μm or above, it is difficult to form a transparent electrode in this region. Particularly when beams of light pass perpendicularly through the film, they are almost fully absorbed in most cases if the film is used as the buffer layer 3 on the optical waveguide path 2, even though the absorption loss is small. Furthermore in this case, the buffer layer 3 must be divided into the shapes of the electrodes 4, 5 because it fundamentally plays a role equivalent to that of the electrodes.

Another proposal (KOKAI (Japanese Unexamined Patent Publication) No. 1-155631: Article A: Electronics Lett. Vol. 26, No. 17, pp. 1409–1410) contemplates trapping mobile ions by assuming that ions in the buffer layer 3 move and cause localization of ions because of the impressed voltage, and thus generate the DC drift. The introduction of the trap to prevent localization of the ions is common in semiconductor technology. According to the results of the Article A executing this method, an improvement of the DC drift has been attained by doping P. Eventually, however, the stable state can be kept for only two hours, and at least 80% of the DC drift occurs in the course of three hours. FIG. 27 shows the DC drift characteristics of the $SiO_2$ buffer layer 3 to which nothing is added, according to the prior art structure. Compared to the results of the Article A, the characteristics are much better, and the doping effect of P as the trap cannot be observed.

Furthermore, there has been still another proposal wherein an upper layer of the buffer layer is shaped into a structure where a metal or a semiconductor exists in granular form so as to permit easy injection of electrons into the buffer layer and mitigation of the DC drift (KOKAI (Japanese Unexamined Patent Publication) No. 3-127023). This structure is characterized by its two-layered structure wherein a metal or semiconductor element is locally contained in a granular and metallic state without being oxidized, in an inner electrode of the buffer layer and at an interface portion of the buffer layer. However, the DC drift characteristics of the optical waveguide device fabricated by this method have not yet reached the level of stability required by optical communication systems, as described in Article B (Papers of Electronic Data Communication Society, c-1, Vol. 1. J75-C-1, No. 1, pp. 17–26, January, 1992).

In the field of the optical waveguide devices that operate when an electric field is applied from the electrodes formed on the buffer layer formed on the optical waveguide path formed inside the surface of the opto-electric crystal substrate, to the optical waveguide path, the change of outgoing light with time resulting from the impressed D.C. (direct current) voltage component is referred to as the "DC drift". Although a large number of studies have so far been made to solve this DC drift, no report or data thereby solving this problem has been forthcoming.

SUMMARY OF THE INVENTION

Recently, practical utilization of ultra-high speed external optical modulators and optical switches using optical waveguide devices, particularly, lithium niobate ($LiNbO_3$) waveguide paths, have been in demand. The present invention solves the DC drift problem which has been the greatest problem preventing the practical utilization of waveguide devices using an electro-optical effect.

To accomplish the object described above, the present invention provides an optical waveguide device comprising an optical waveguide path formed inside a surface of an electro-optical crystal substrate, a buffer layer formed on the optical waveguide path, and a driving electrode for impressing an electric field so as to change a refractive index of the optical waveguide path formed on the buffer layer, wherein the buffer layer is made of a transparent dielectric or insulator of a mixture between silicon dioxide and an oxide of at least one element selected from the group consisting of the metal elements of the Groups III to VIII, Ib and IIb of the Periodic Table and semiconductor elements other than silicon, or a transparent dielectric or insulator of an oxide between silicon and at least one of the metal elements and semiconductor elements described above.

In the optical waveguide device according to the present invention, since the buffer layer has a structure as described above, negative DC drift characteristics are exhibited at the initial stage with the passage of time, and additives affect mobile electrons or ions so that an increase of the DC drift of the optical waveguide device can be flattened much more than in the prior art devices. Therefore, the DC drift characteristics can be reduced for an extended period of time.

BRIEF DESCRIPTION OF THE DRAWINGS

FIG. 4 is a view schematically showing a target for forming a hole in silicon dioxide and burying an oxide of other metals or semiconductors in the hole.

FIG. 5 is an explanatory view explaining the case where a film is formed in a ultra-multiple-layered structure on an optical substrate from a plurality of electron beam sources or targets.

FIGS. 24A and 24B show the optical waveguide device shown in FIG. 23, wherein FIG. 24A is a sectional view and FIG. 24B is an electric equivalent circuit digram.

DESCRIPTION OF THE PREFERRED EMBODIMENT

Figure 1:
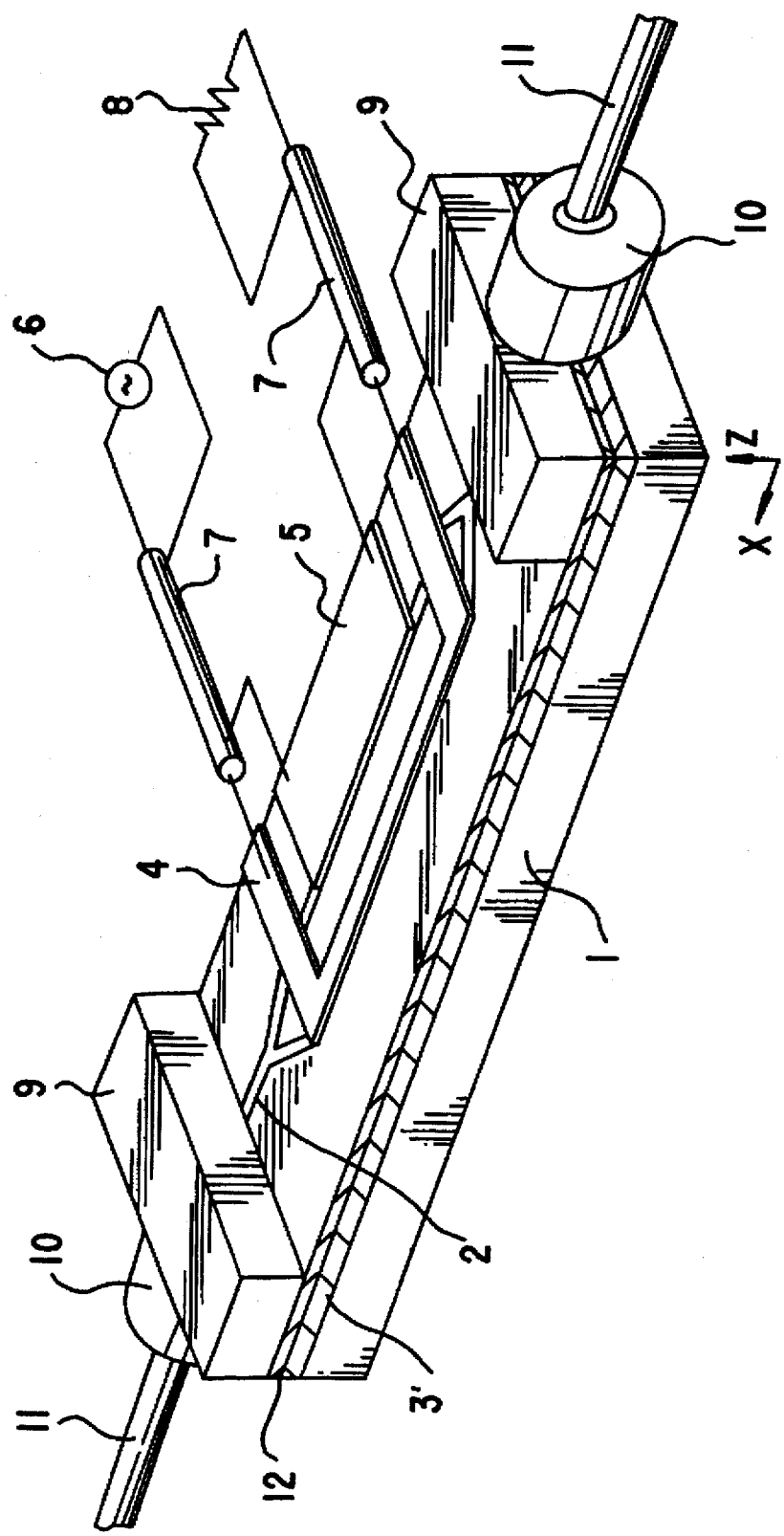
FIG. 1 is a perspective view showing a structure of an optical waveguide device according to an embodiment of the present invention.

FIG. 1 is a perspective view showing a structure of a waveguide type modulator according to an embodiment of the present invention, and like reference numerals are used to identify like constituents as in the prior art. In the drawing, reference numeral 1 denotes a lithium niobate substrate, which is cut in such a manner that a Z axis lies in a direction of thickness. A 950 Å-thick titanium (Ti) layer is formed by an electronic beam deposition method on the surface of the waveguide substrate 1, and patterning is made so as to define an optical waveguide in an X direction of a crystal axis. The substrate 1 is then heated at 1,050° C. for 10 hours in an oxidizing atmosphere so as to thermally diffuse titanium into the waveguide substrate 1. In this way, a belt-like optical waveguide path 2 having a width of about 7 μm is formed so that the waveguide path 2 branches at one of the ends thereof, couples at the other end and is parallel at the center with a gap of 15 μm.

Figure 6:
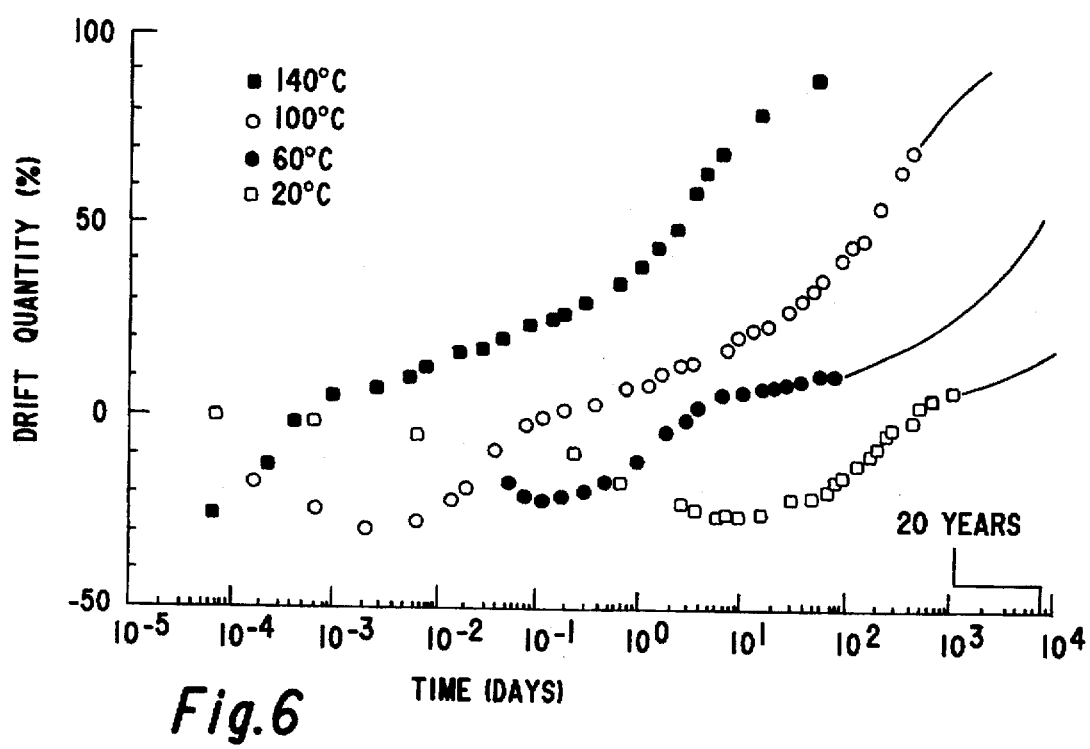
FIG. 6 is a diagram showing DC drift characteristics of an optical waveguide device according to an embodiment of the present invention.

Silicon dioxide ($SiO_2$) containing 5 mol % of $In_2O_3$ and 5 mol % of $TiO_2$ is deposited on the entire surface of this optical waveguide 2 by the electron beam deposition method or by a sputtering method to form a buffer layer 3'. The buffer layer 3' thus formed is annealed at 600° C. for 10 hours in a wet oxidizing atmosphere. Since resistance is sufficiently high in this buffer layer 3', the buffer layer 3' need not be separated particularly between electrodes. Next, a 1,000 Å-thick Si film 12 is formed by sputtering to improve temperature characteristics. Thereafter, electrodes 4 and 5 are formed on the optical waveguide 2. In other words, the buffer layer in this device consists of a composition $(SiO_2)_{0.95}(TiO_2)0.05$ as a base and containing 5 mol % of $In_2O_3$. FIG. 6 shows DC drift characteristics of a Ti-diffusion $LiNbO_3$ waveguide type external modulator thus formed. The diagrams evaluate the DC drift characteristics at 20° C., 60° C., 100° C. and 140° C., and it can be understood that this phenomenon is accelerated depending on temperature. The activation energy in this case is about 1 eV.

Strictly speaking, the composition of the buffer layer film hereby formed is not a compound or mixture consisting of a composition ratio of $SiO_2$, $TiO_2$ and $In_2O_3$, but is believed to be a compound or mixture consisting of a composition ratio of $SiO_x$, $TiO_y$ and $InO_z$. From the necessity for quantitatively expressing the contents, however, the foregoing and following description will express the contents in terms of mol % using the molecular weight.

Several effective methods are available to fabricate these buffer layers as will be illustrated below. In any case, it is of importance to form the film while the substrate temperature is kept below 250° C. in order not to generate a defective layer on the substrate surface.

(1) A method of forming the buffer layer by electron beam deposition or sputtering by mixing in advance silicon dioxide and an oxide of other metals or semiconductors, then sintering the mixture, and using the resulting target.

Figure 2:
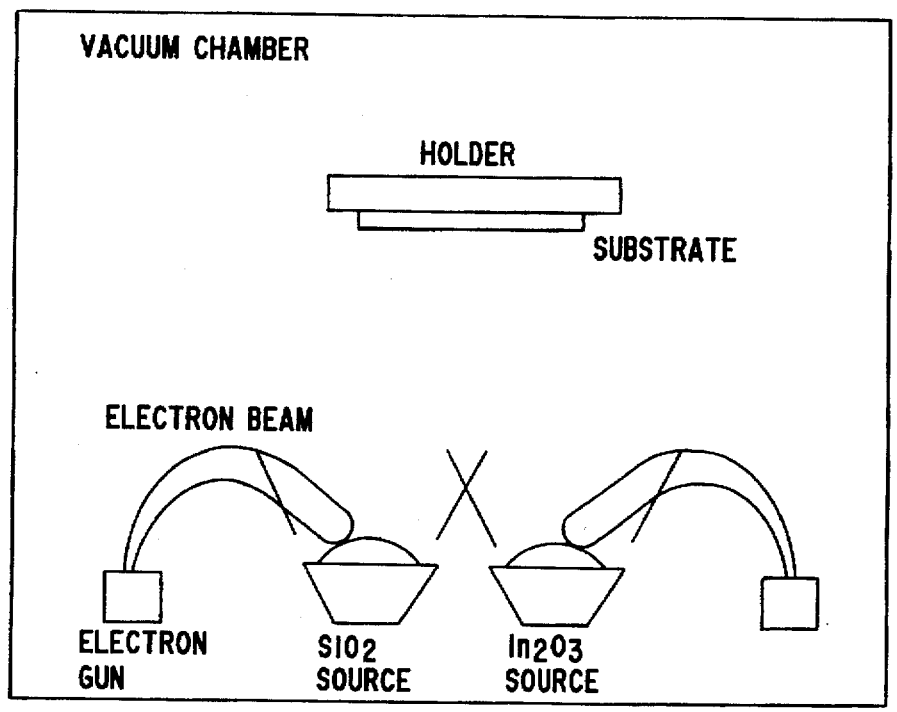
FIG. 2 is a view schematically showing an apparatus for simultaneously vacuum depositing silicon dioxide and an oxide of other metals or semiconductors.

(2) A film formation method by multi-source deposition or multi-electrode sputtering by using an apparatus equipped with a plurality of electron beam sources or sputter targets for simultaneously affecting vacuum deposition (FIG. 2) or sputtering of silicon dioxide and an oxide of other metals or semiconductors.

Figure 3:
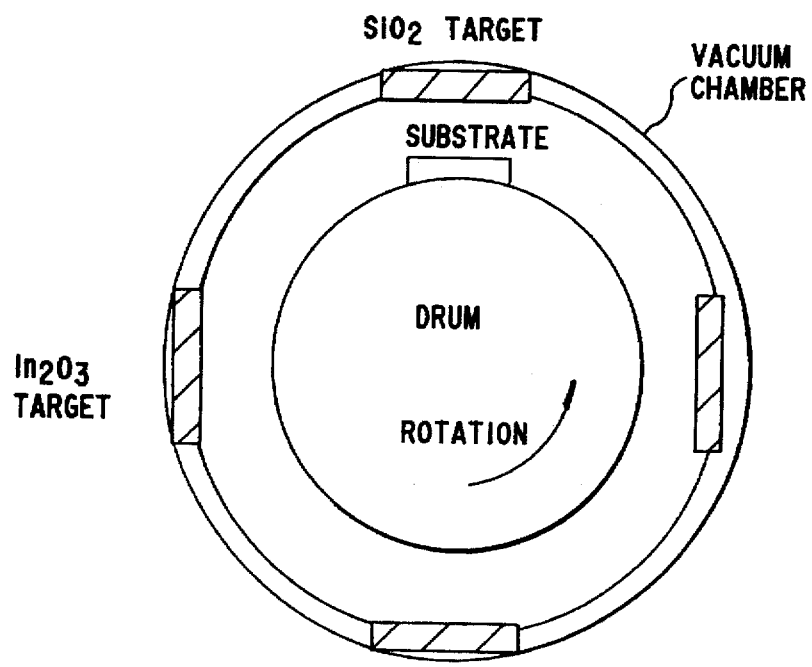
FIG. 3 is a view schematically showing an apparatus for rotating an optical substrate.

(3) A method of forming a film in an ultra-multiple-layered structure on an optical substrate from a plurality of sources or targets (FIG. 5) by using an apparatus equipped with a plurality of electron beam sources or sputter targets and capable of rotating (FIG. 3) or reciprocating the optical substrate. In this case, it is effective to shape each layer to a thickness of from 0.2 to 200 Å.

(4) A method of forming the buffer layer by sputtering by placing an oxide of other metals or semiconductors on a silicon dioxide target, or forming a hole and burying the oxide (FIG. 6).

(5) A method of forming a buffer layer film under the state of an oxide, wherein a part of the whole of the electron beam sources or the sputter targets of items (1) to (4) described above are formed under the state of a semiconductor, and vacuum deposition or sputtering is carried out in an oxygen-containing reactive atmosphere.

The technical content described above is similarly effective when the object device is a switch or a wide variety of other devices, and is also effective for waveguide devices using other electro-optical crystal such as a $LiTaO_3$ crystal.

Figure 7:
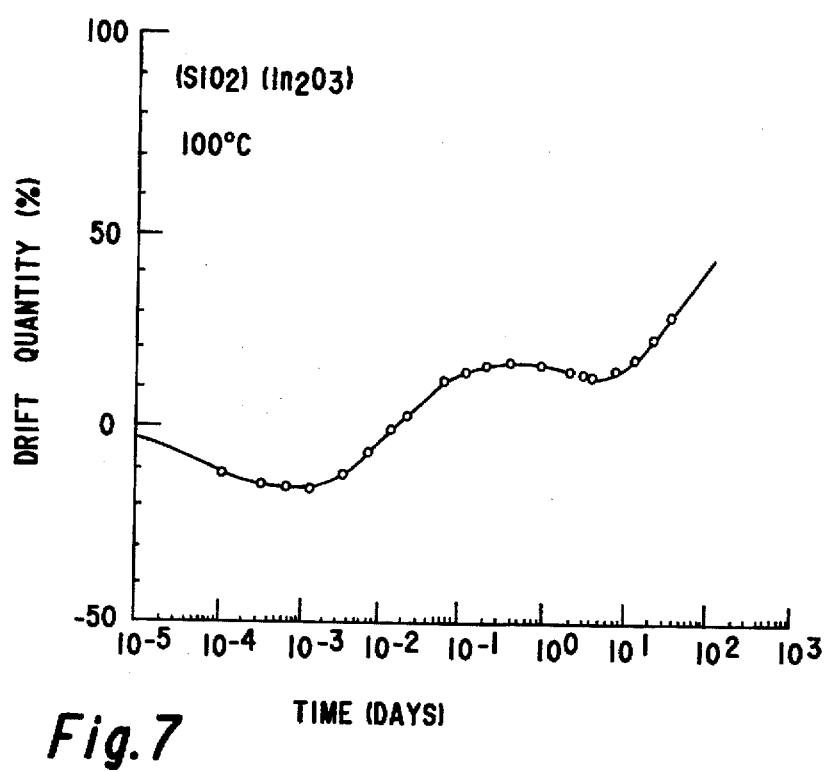
FIG. 7 is a diagram showing DC drift characteristics when indium is added in a amount of 5 mol %.
Figure 27:
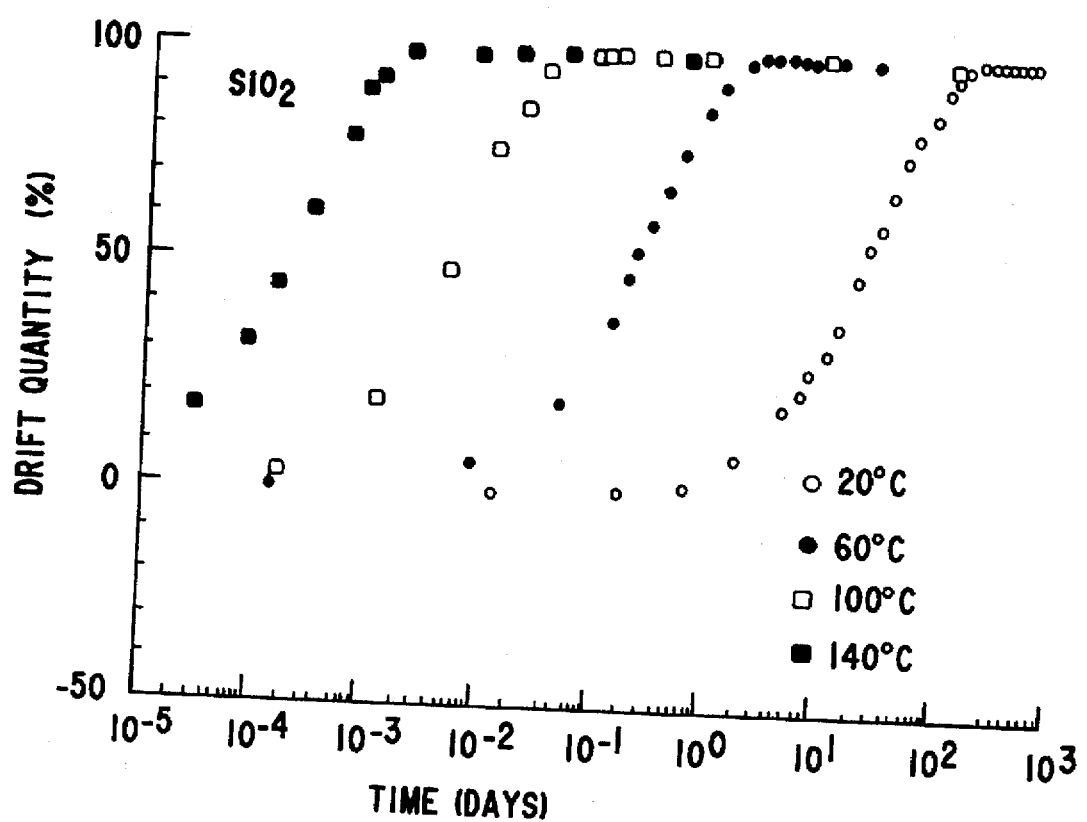
FIG. 27 shows DC drift characteristics according to a conventional buffer layer structure.

One of the fundamental constructions in the present invention resides in that a metal element of the Group IIIb is contained in the buffer layer 3'. FIG. 7 shows the result when an $SiO_2$ buffer layer 3' containing 5 mol % of indium (In) of an element of the Group IIIb as $In_2O_3$ is formed on the waveguide, which is formed in turn by thermally diffusing Ti on the $LiNbO_3$ substrate. In comparison with the buffer layer 3 consisting of the composition of $SiO_2$ alone, as shown in FIG. 27, it can be understood that an increase in the DC drift is retarded significantly under the same conditions at 100° C.

As described above, in the present invention, the buffer layer is formed, as a whole, as the mixture of the oxides of metals or semiconductors, and the present invention is entirely different from the structure described in the article B, which divides the layer into two layers and moreover, the metal is as such contained in granular form in the interface layer between the electrode and the buffer layer. Furthermore, when experiments were carried out shaping only the interface layer by the oxide mixture film, no improvement was observed at all in the DC drift. This means that the influence of the interface structure on the DC drift characteristics is small, and an improvement of the buffer layer as a whole is necessary.

Figure 8:
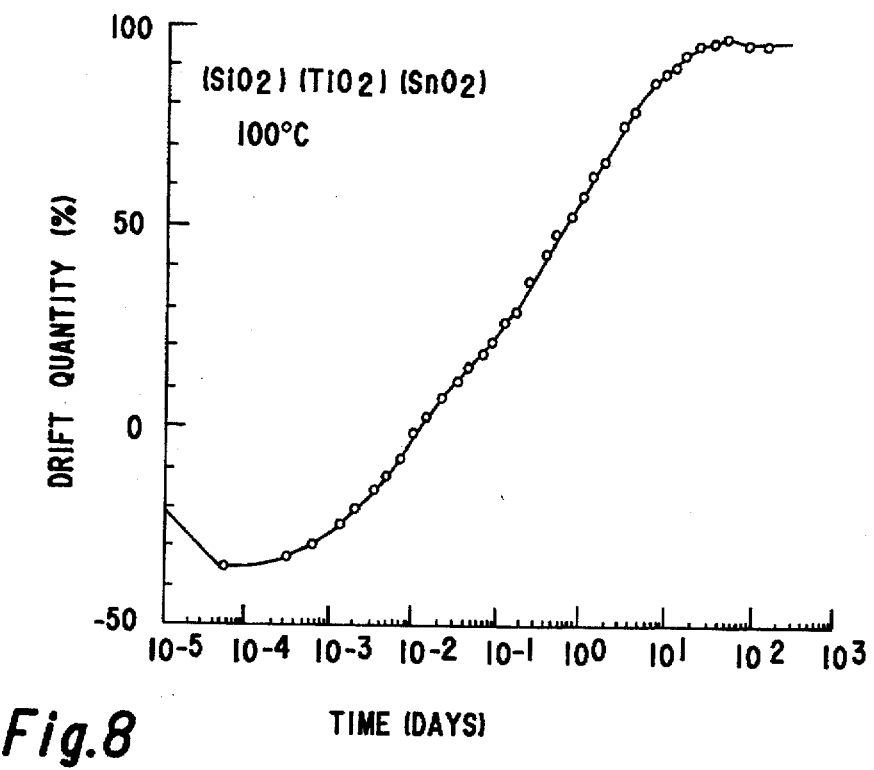
FIG. 8 is a diagram showing DC drift characteristics when tin is added.

The reason a negative DC drift of about 20% occurs at the initial stage as in FIG. 7 is because the resistance drops owing to the addition of In. Thereafter, a positive drift occurs, presumably due to mobile electrons and mobile ions produced by an electric field. This positive drift is also drastically reduced owing to the effect of the oxide of a metal or semiconductor element admixed with silicon oxide. It has been confirmed experimentally that the metal elements of the Group IIIb of the Periodic Table provide a remarkable effect of reducing the increase in the DC drift. On the other hand, the DC drift characteristics of the case where tin (Sn) having the atomic number next to that of In in the Period Table is added, is improved significantly compared to the case where tin is not added, as shown in FIG. 8, but the improvement is not as great as in the case of In, which means that the degree of the effect obtained depends on the element employed.

Figure 9:
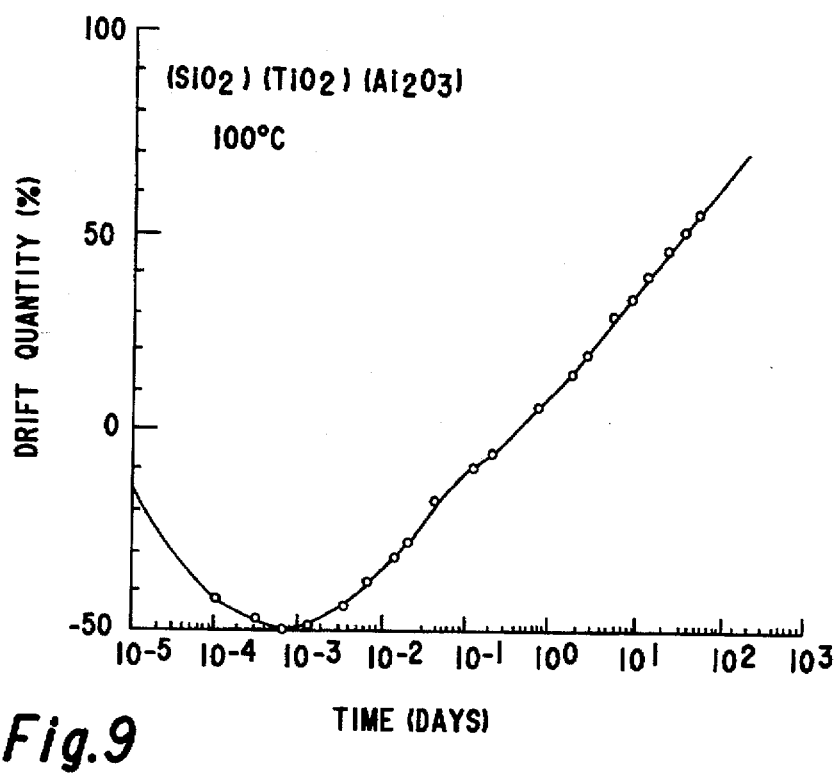
FIG. 9 is a digram showing DC drift characteristics when aluminum is added.

FIG. 9 shows the result of the case when another Group IIIb element, Al, is added. In this case, too, the element provides the effect of improving the DC drift characteristics over a long period of time. The Group IIIb elements are particularly effective for improving the DC drift characteristics over a long period of period, among others, In.

Figure 10:
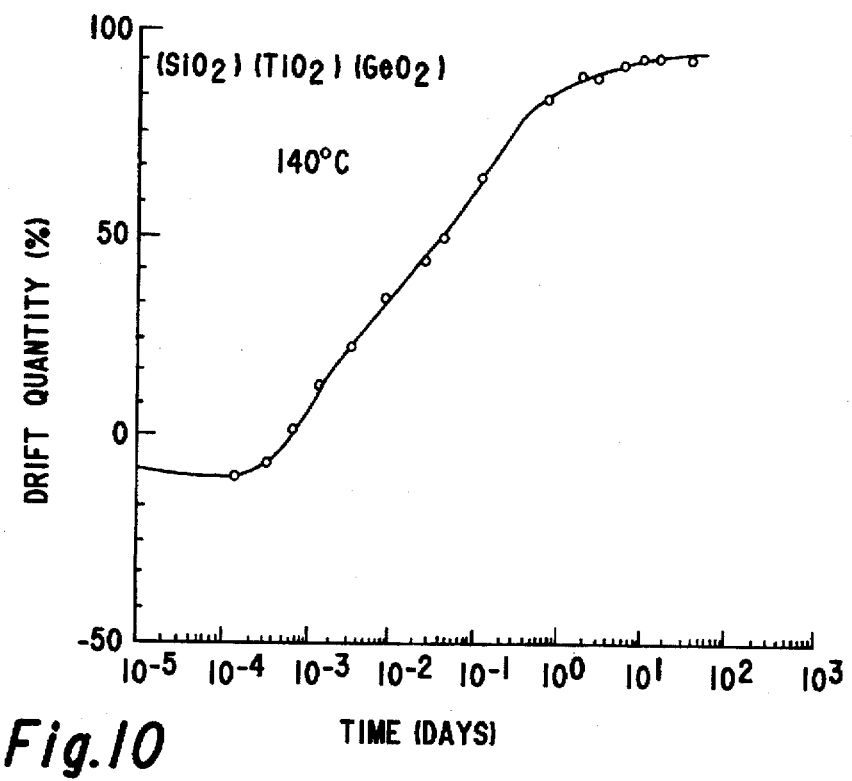
FIG. 10 is a diagram showing DC drift characteristics when germanium is added in an amount of not greater than 1 mol %.
Figure 11:
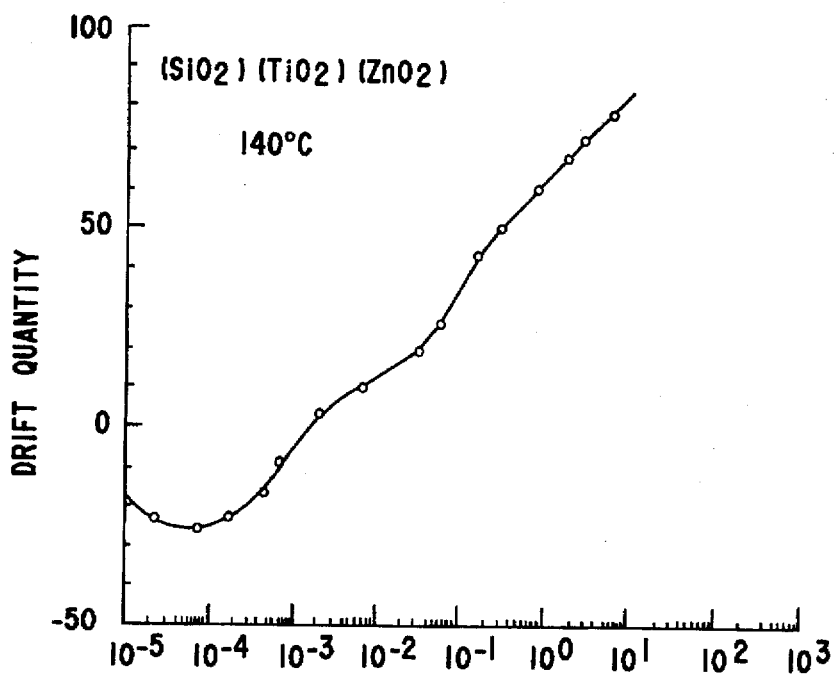
FIG. 11 is a diagram showing DC drift characteristics when zinc is added in an amount of 5 mol %.
Figure 12:
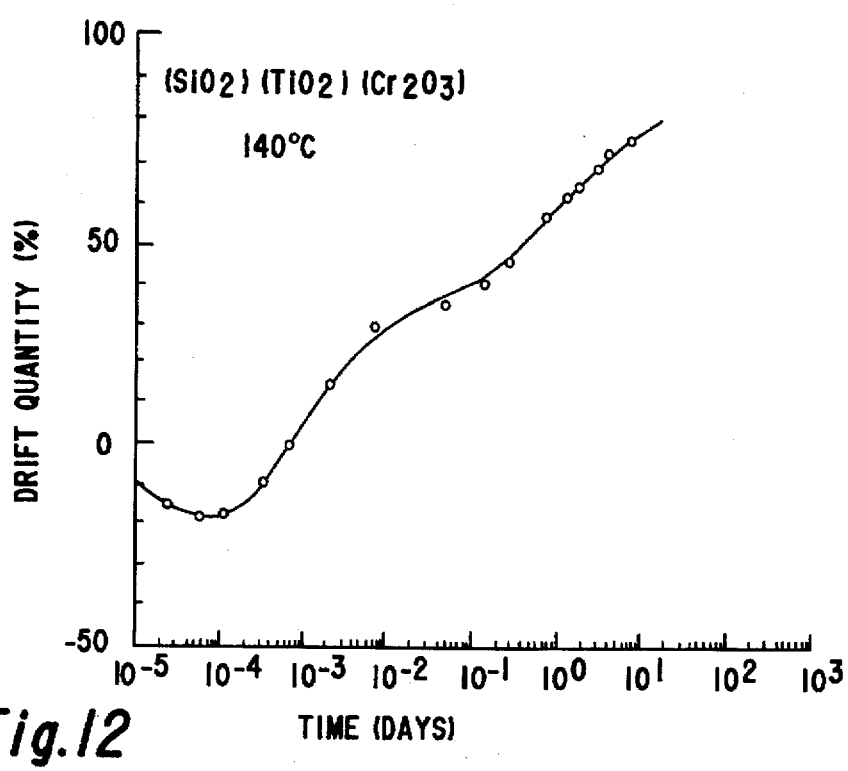
FIG. 12 is a diagram showing DC drift characteristics when chromium is added in an amount of 5 mol %.

On the other hand, it is also effective to add a compound containing at least one kind of metal element other than the Groups Ia and IIa of the Period Table, that is, the metal elements of the Groups III to VIII, Ib and IIb of the Periodic Table, to silicon dioxide ($SiO_2$). For example, FIG. 10 shows DC drift characteristics when up to 1 mol % of $GeO_2$ is contained in the base composition of $(SiO_2)_{0.95}(TiO_2)_{0.05}$ in the same way as in the buffer layer in the device described above, and FIG. 11 shows DC drift characteristics when 5 mol % of ZnO is contained. Furthermore, FIG. 12 shows DC drift characteristics when $Cr_2O_3$ is contained in the amount of 5 mol %. The improvement in the stability of the operation of the device can be observed in all of these cases.

Figure 14:
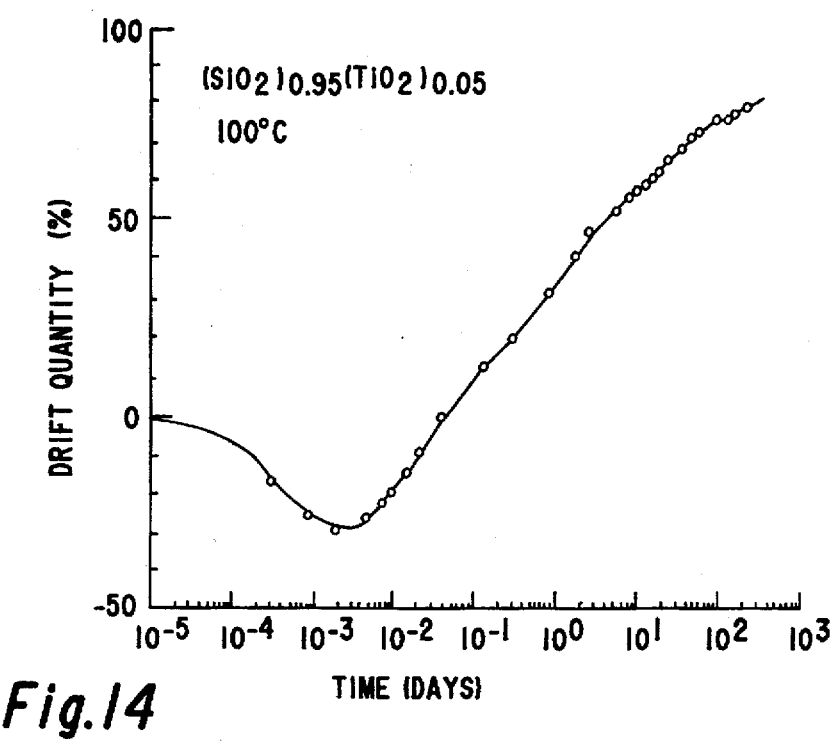
FIG. 14 is a diagram showing DC drift characteristics when tititaium is added in an amount of 5 mol %.
Figure 15:
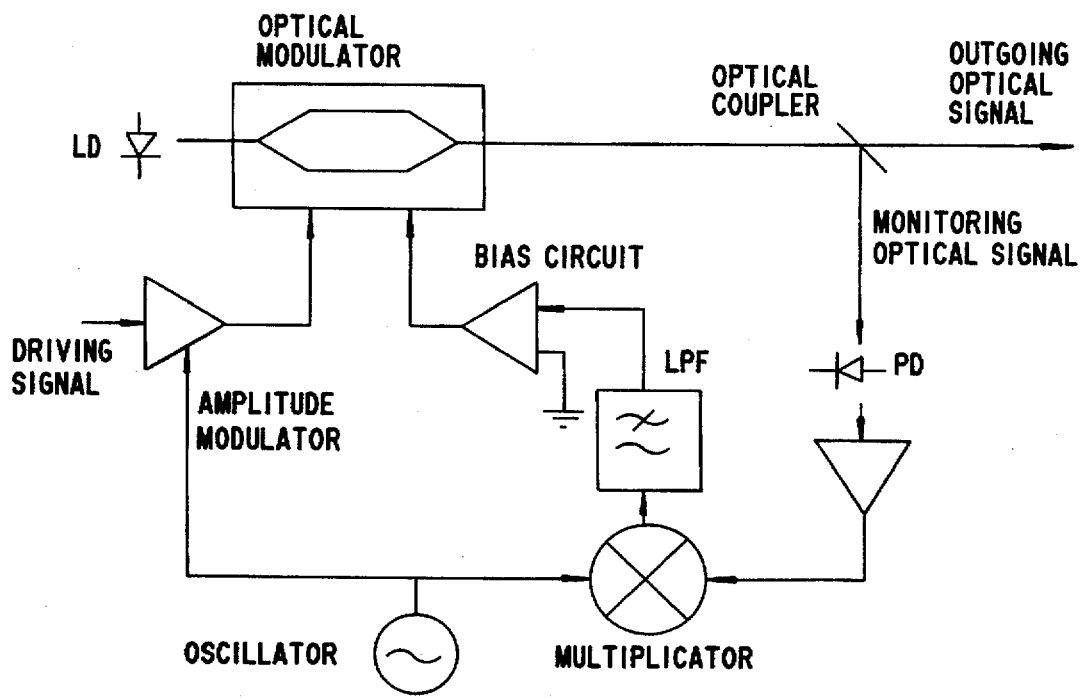
FIG. 15 is a block circuit diagram of an optical waveguide device according to the present invention in which a modulator and DC drift compensation circuit are integrated with each other.
Figure 26:
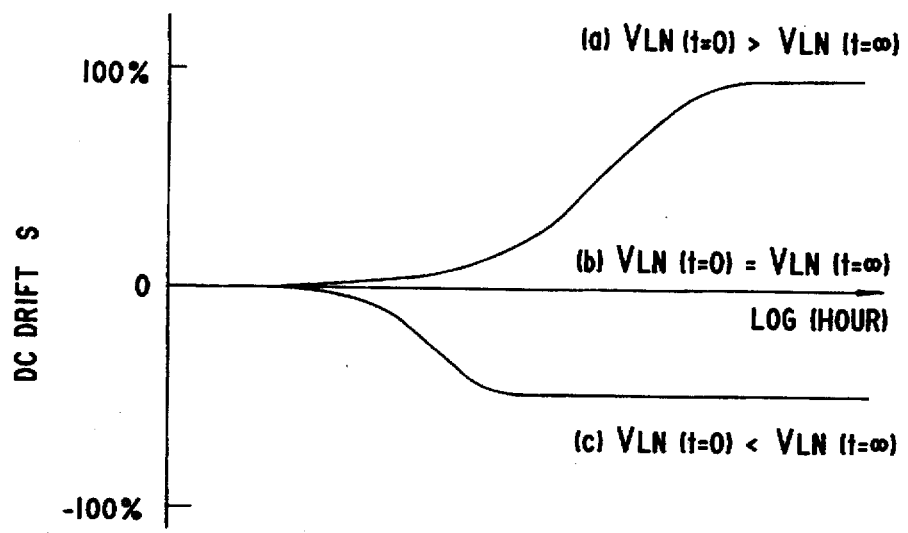
FIG. 26 shows the change of a DC drift with the passage of time.

As shown in FIG. 14, when Ti of the Group IVa is added so that the proportion of the Ti element is 5 mol % to the total of Si and Ti, an improvement in the DC drift characteristics can be observed compared to the case of $SiO_2$ alone (FIG. 27). About −30% negative DC drift in this case results from a drop in electric resistance of the buffer layer film. The resistivity of the buffer layer film in this case is about $10^{15}$ Ωcm. Prior art that utilizes the buffer layer 3' under such a state so as to cope with such a negative DC drift is not known. The prior art reports have exclusively been directed to the accomplishment of the state (b) where the DC drift does not occur in both cases where a positive DC drift occurs (a) and where a negative DC drift occurs (C), as shown in FIG. 26.

Figure 13:
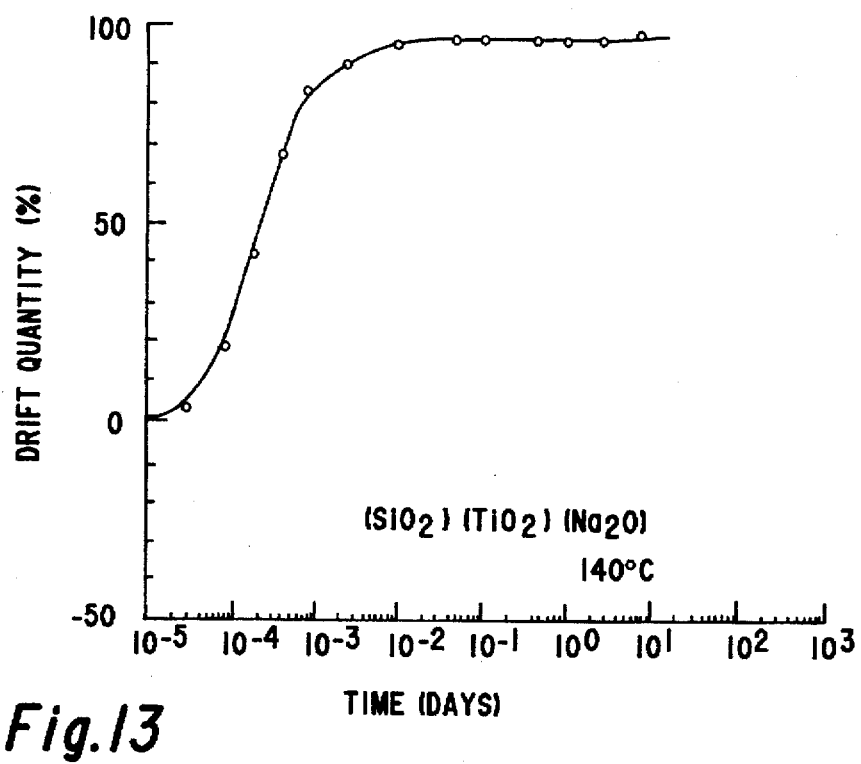
FIG. 13 is a diagram showing DC drift characteristics when sodium is added.

As to the elements of the Groups of Ia and IIa of the Periodic Table, in the case of an Na-containing buffer layer, for example, the effect becomes contrary when compared to the case of only silicon dioxide, as shown in FIG. 13. In this way, the alkali metal elements exert adverse influences on the improvement of the DC drift characteristics.

However, when the DC drift of the device is compensated for externally in accordance with DC drift conditions, such as when the circuit shown in FIG. 13 is effectively utilized, a disparity occurs between the positive and negative DC drifts and in this case, the negative DC drift has an effective meaning. In other words, when a positive 100% DC drift occurs, no large voltage is completely effective when the voltage is applied to compensate for the DC drift, but when a negative DC drift occurs, complete compensation can be effected by a compensation voltage that is smaller than the impressed DC voltage.

Figure 16:
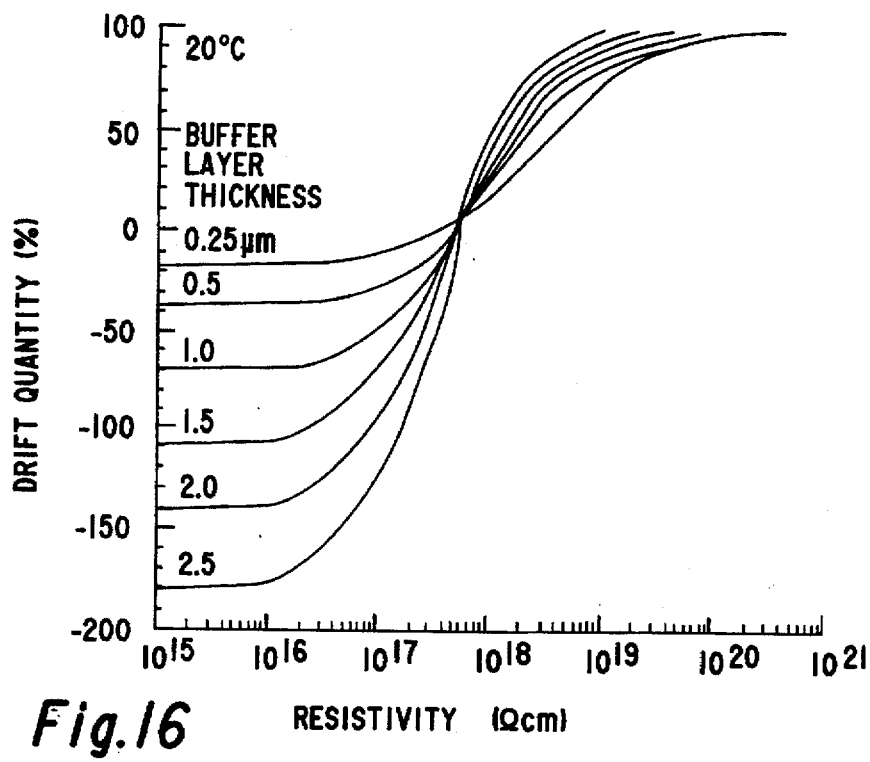
FIG. 16 is a diagram showing the relation between resistivity of a buffer layer and DC drift quantity.
Figure 23:
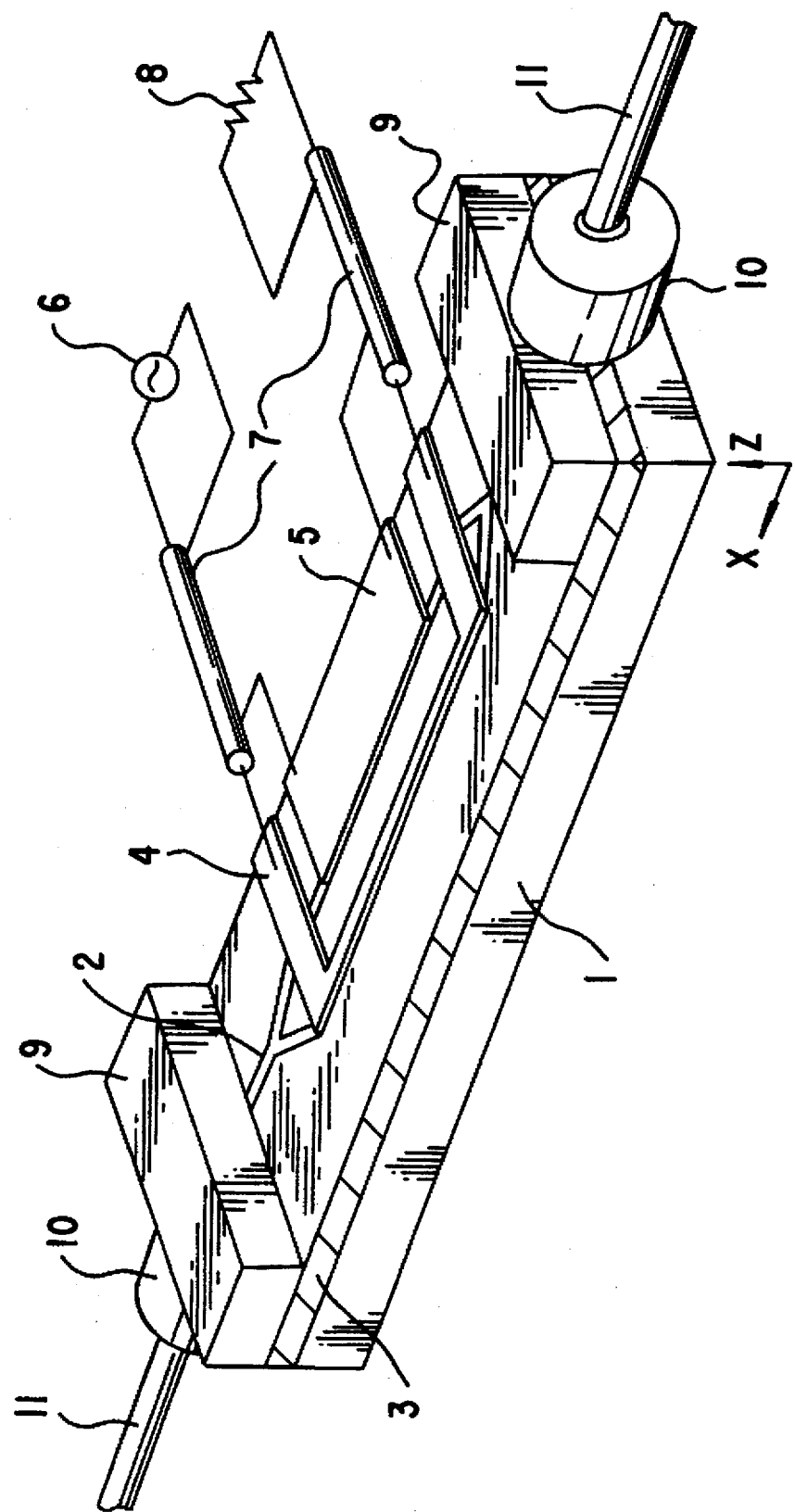
FIG. 23 is a perspective view showing a structure of an optical waveguide device according to the prior art.
Figure 24A:
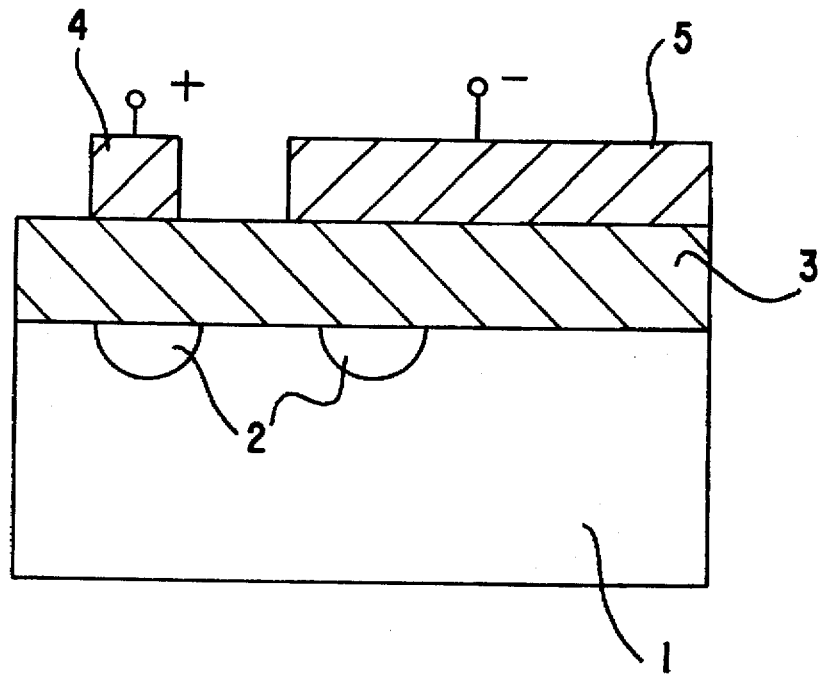
Figure 24B:
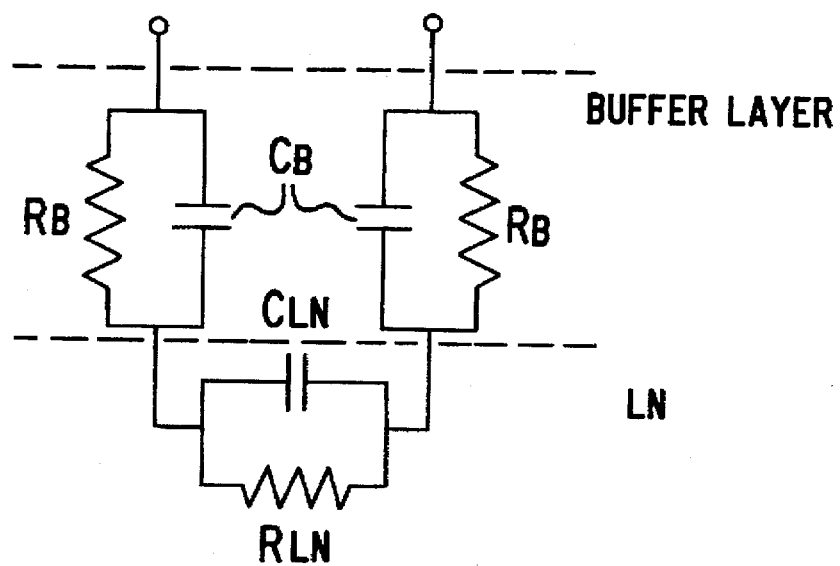
Figure 25:
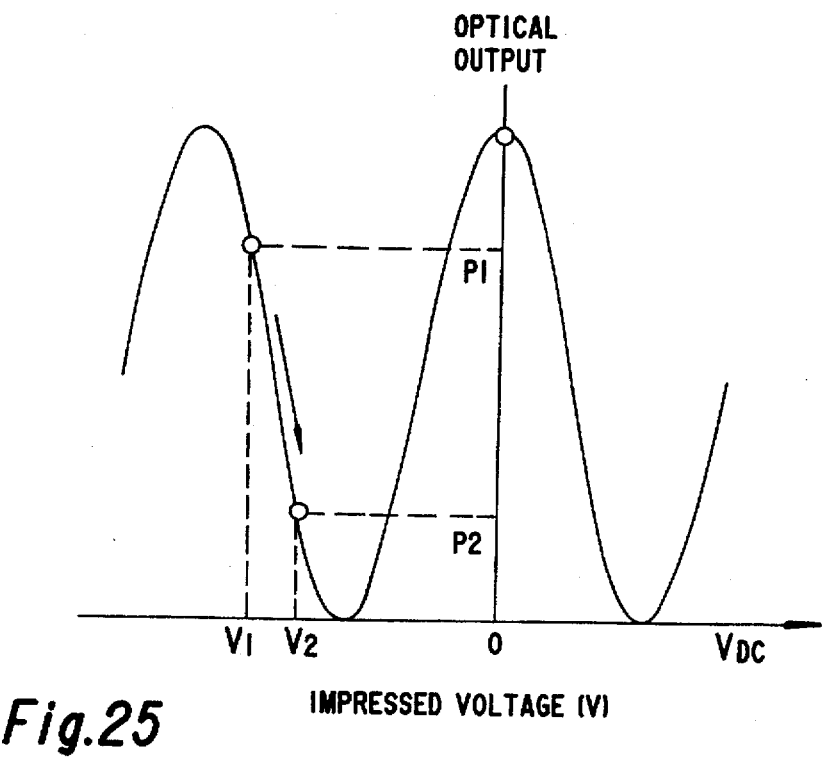
FIG. 25 is a diagram showing the relation between an impressed voltage of a modulator and its optical output intensity.

Therefore, the condition in which the positive DC drift occurs with difficulty is found effective by deliberately mixing an additive to generate a negative DC drift or increasing the thickness of the buffer layer so as to reduce the capacitance of the buffer layer. In the modulators having the structures shown in FIGS. 23 and 24, the DC drift quantity occurring at the initial stage is determined for a modulator having an electrode width of 7 µm, an electrode gap of 15 µm and an electrode thickness of 10 µm using the thickness of the buffer layer 3' and its resistivity as the parameters, the result can be obtained as shown in FIG. 16. In other words, the negative DC drift can be obtained with stability when the buffer layer 3' is fabricated so that resistivity is below $10^{16}$.

Figure 18:
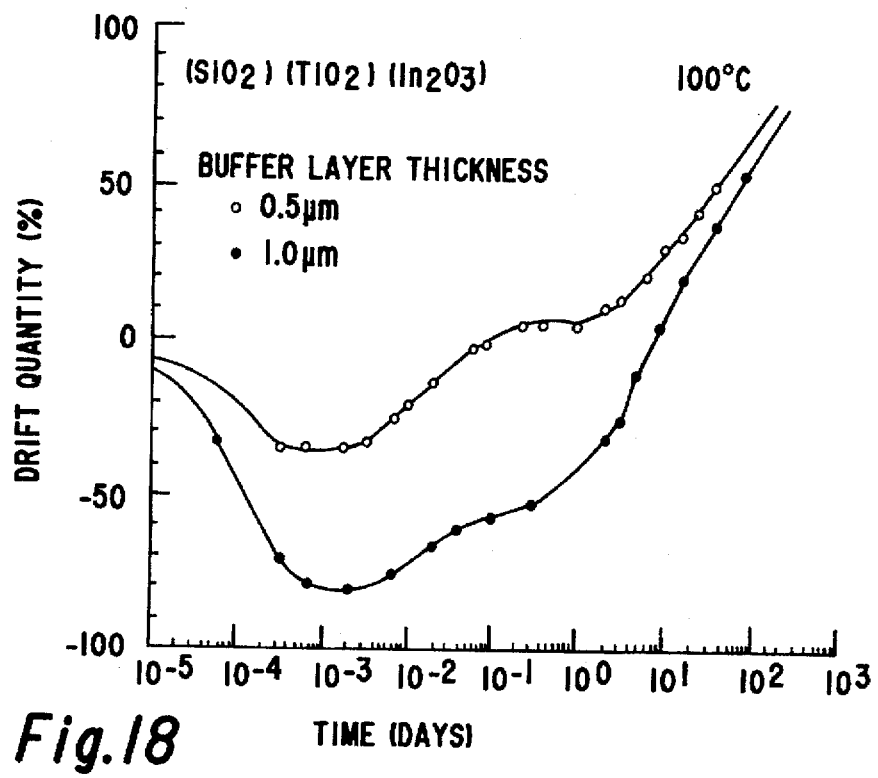
FIG. 18 is a diagram showing DC drift characteristics when the film thickness of a buffer layer is different.

When the resistance of the buffer layer 3' is gradually lowered, absorption of light owing to the free electrons of the buffer layer 3' occurs at an optical wavelength of 1 to 2 µm. Therefore, the resistivity of the buffer layer 3' must be kept at a value not lower than $10^9$ Ωcm. It is advantageous in this case to fabricate the buffer layer 3' to a thickness of at least 0.25 µm in order to avoid optical absorption by the electrodes. As a result, the DC drift quantity is below −20%. It can also be appreciated from FIG. 16 that when the buffer layer was as thick as 2.5 µm, the DC drift percentage was nearly to −200%. FIG. 18 shows the experimental results when the film thickness varied, and it can be appreciated from this diagram that the negative DC drift quantity changes with film thickness.

Accordingly, the drift quantity can be set to the range of −20% to −200% by selecting the material (resistivity, dielectric constant) of the buffer layer 3' and its thickness, and in this case, the magnitude of the DC drift becomes smaller in such a manner as to correspond to the shift on the negative side. Needless to say, this phenomenon not only provides the effect of reducing resistance but also inhibits the mobility of the mobile electrons and the mobile ions by the mixture of a plurality of metals and semiconductors when compared to the case where only silicon dioxide is used. By this effect, a significant improvement is attained not only in providing a short-term effect in that the DC drift is shifted to the negative side but also in providing a long-term effect in that the DC drift gradually shifts in the positive direction.

Figure 17:
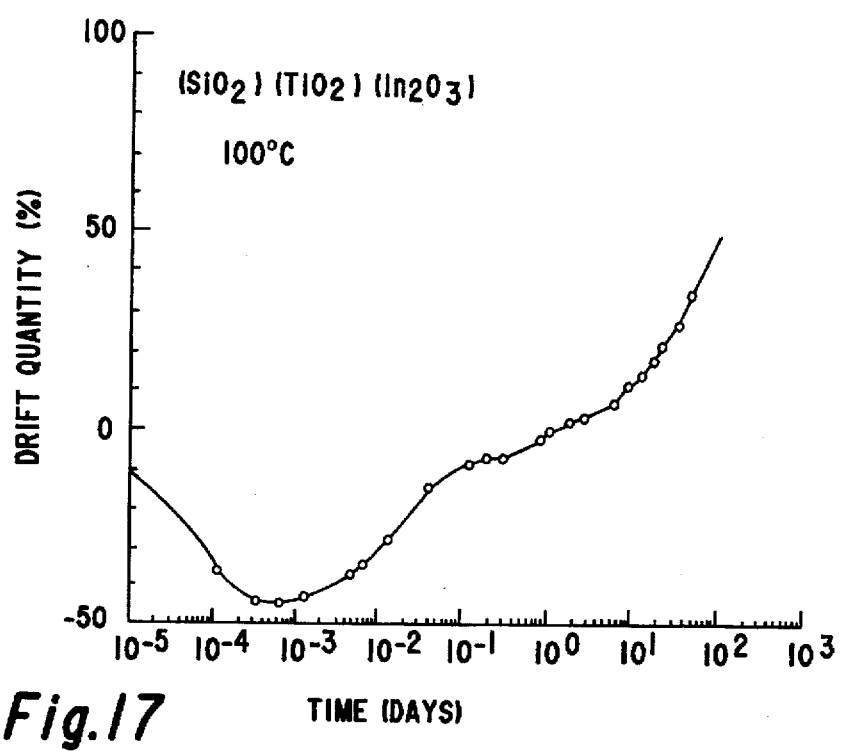
FIG. 17 is a diagram showing DC drift characteristics when indium is added in an amount of 5 mol %.

The addition of further material to the buffer layer 3' containing the Group IIIb element effectively improves the DC drift characteristics. FIG. 17 shows the effect when 5 mol % of $TiO_2$ is further added to the $SiO_2$ buffer layer containing 5 mol % of the $In_2O_3$ element to the total of the metal or semiconductor in the film. It can be seen from the diagram that the quantity of the negative DC drift at the initial stage is further reduced.

The DC drift over a long period of time (more than ten days) is also further improved. When other metal elements are added to the Group IIIb element, a synergistic effect is believed to occur. It is possible to reduce the resistance by increasing the amount of In, but this is not effective because optical absorption occurs in the 1 to 2 µm wavelength range, which is important for optical communication.

Figure 19:
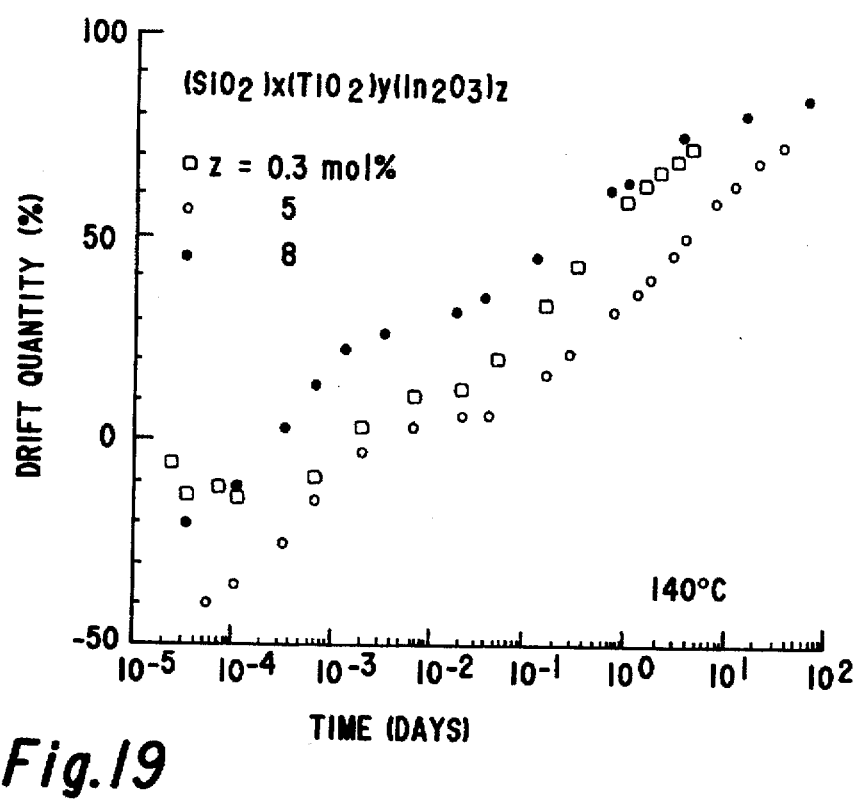
FIG. 19 is a diagram showing DC drift characteristics when indium is added.
Figure 20:
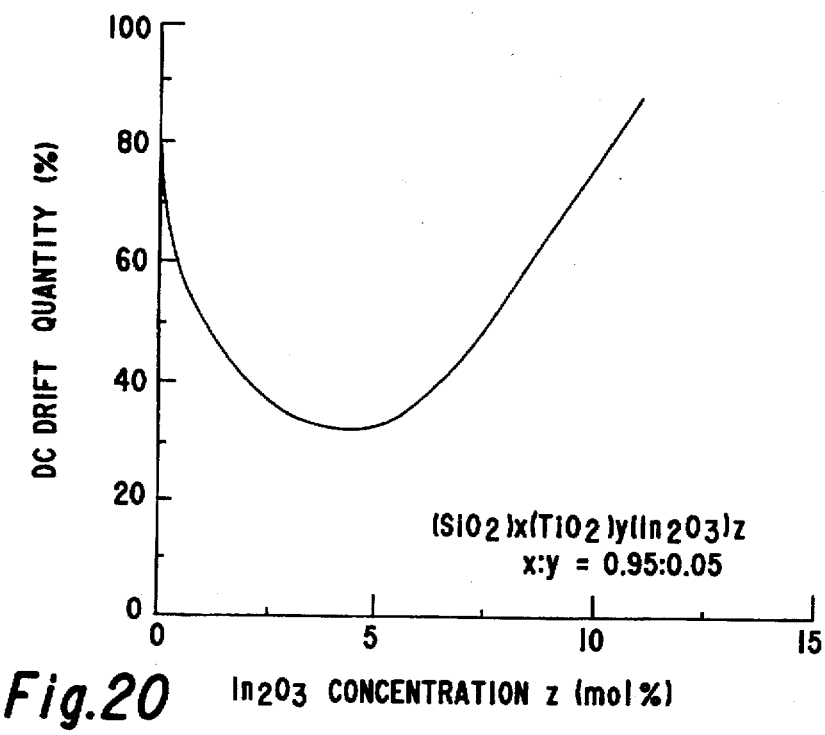
FIG. 20 is a diagram showing the relation between the amount of addition of indium and DC drift quantity.
Figure 21:
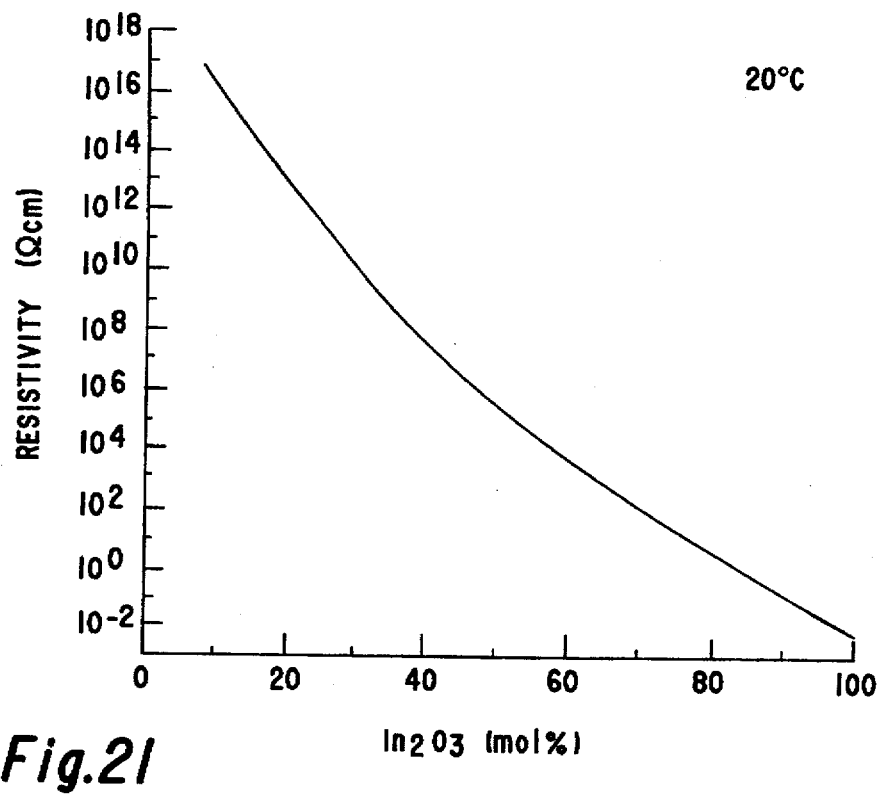
FIG. 21 is a diagram showing the relation between resistivity of a buffer layer and indium content.

The content in this case is preferably from 0.001 to 35 mol % because such a content does not affect the absorption of light. Judging from the result of FIG. 19 showing the relationship between the $In_2O_3$ content and the DC drift quantity, however, a significant improvement could be obtained by increasing the content more than ten times to 5 mol % from a trace amount of 0.3 mol % of $In_2O_3$. FIG. 20 shows the evaluation result of the DC drift quantity at 140° C. after one day. An optimum value existed for the content, and the characteristics reached the maximum near 4 mol %. FIG. 21 shows the relationship between the $In_2O_3$ concentration and the electric resistance in the buffer layer film consisting of the $SiO_2$-$In_2O_3$ mixture film. The higher the concentration, the lower the resistivity. Therefore, the existence of the optimum content obviously indicates that the DC drift does not improve by merely lowering the resistivity with the aim of obtaining a transparent electrode. Furthermore, the resistivity was $10^9$ Ωcm at a content of 35 mol %, and this resistance value does not represent a conductive film. It can thus be understood that the present invention does not improve the DC drift by introducing of the transparent conductive film simply by the addition of substances.

Figure 22:
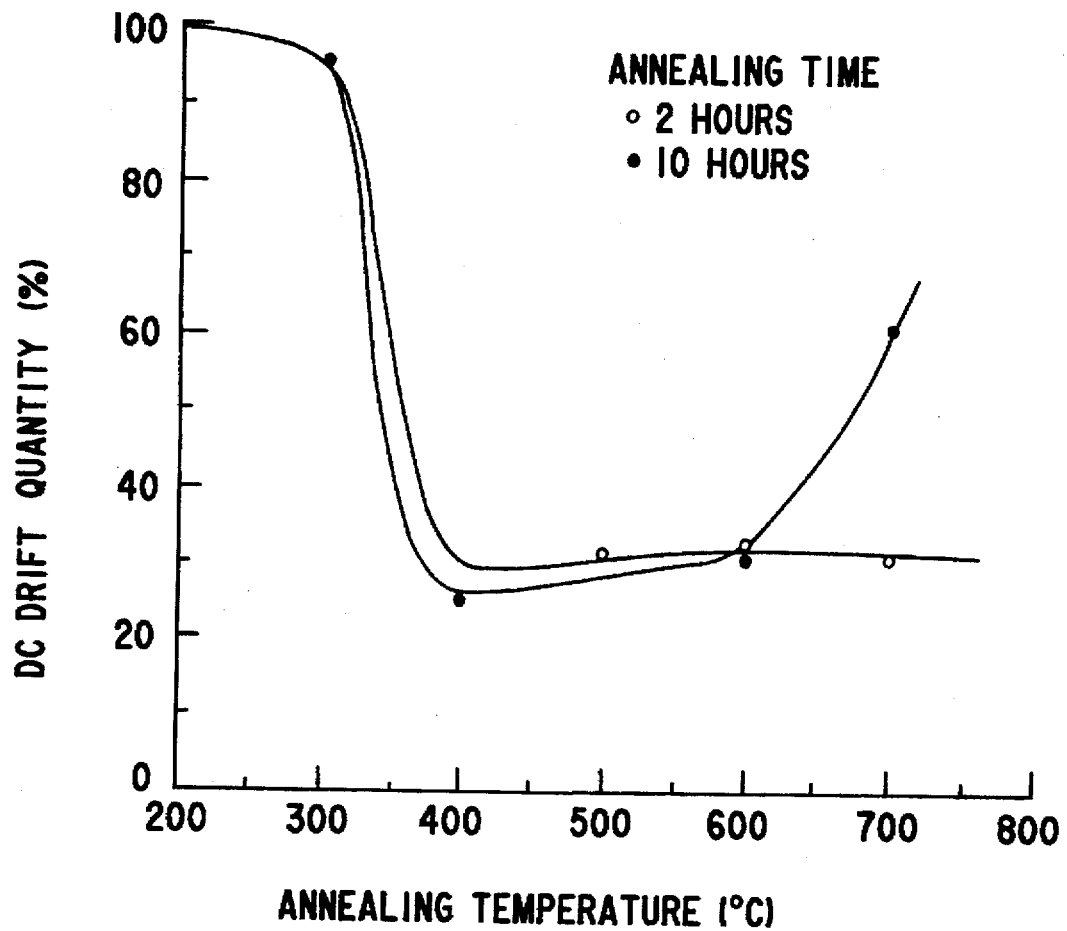
FIG. 22 is a diagram showing an annealing condition and DC drift quantity.

The addition of the Group IIIb elements of the Periodic Table to the buffer layer 3' according to the present invention has a close relation with annealing in the oxidizing atmosphere after film formation by electron beam deposition, resistance heating deposition, sputtering and other techniques. FIG. 22 shows a change in the DC drift quantity when the annealing temperature and the annealing time are changed. Annealing at a temperature of 300° C. to 700° C. for a time of from 2 to 10 hours is effective.

As described above, the present invention can significantly improve the conventional DC drift characteristics, can obtain more effective DC drift characteristics by effectively utilizing the negative DC drift, and can thus accomplish ultra-high speed external modulators and matrix switches satisfying the requirements for optical communication devices, for which a very high degree of reliability is a requisite.

We claim:

1. An optical waveguide device comprising:
   an electro-optical crystal substrate having an optical waveguide path formed inside the surface thereof;
   an electrode disposed at a location along said electro-optical crystal substrate adjacent said optical waveguide path, for applying an electric field to change a refractive index of said waveguide path; and at least one layer formed between said electro-optical crystal substrate and said electrode;

wherein said layer has a refractive index lower than the refractive index of said waveguide path and contacts the surface of said substrate, and said layer is a transparent compound of silicon oxide containing one or more metal oxides such that said layer has a resistivity in a range of $10^9 \Omega$ per cm to $10^{16} \Omega$ per cm.

2. An optical waveguide device comprising:

an electro-optical crystal substrate having an optical waveguide path formed inside the surface thereof;

an electrode disposed at a location along said electro-optical crystal substrate adjacent said optical waveguide path, for applying an electric field to change a refractive index of said waveguide path; and at least one layer formed between said electro-optical crystal substrate and said electrode;

wherein said layer has a refractive index lower than the refractive index of said waveguide path and contacts the surface of said substrate, and said layer is a transparent mixture of silicon oxide containing one or more metal oxides such that said layer has a resistivity in a range of $10^{16} \Omega$ per cm.

3. An optical waveguide device as claimed in claim 1 or 2, wherein a further layer of silicon is formed on said layer which is in contact with said substrate surface.

4. An optical waveguide device as claimed in claim 1 or 2, wherein said layer which is in contact with said substrate surface is composed of a transparent compound formed by silicon oxide and an oxide of at least one metal other than alkali metal elements.

5. An optical waveguide device as claimed in claim 1 or 2, wherein said layer which is in contact with said substrate surface is comprised of silicon oxide and an oxide of at least one metal selected from the group consisting of Ti, In, Sn, Al, Cr and Zn.

6. An optical waveguide device as claimed in claim 1 or 2, wherein said layer which is in contact with said substrate surface is composed of a transparent mixture formed by silicon oxide and an oxide of at least one metal other than alkali metal elements.

7. A method for forming an optical waveguide device, comprising the steps of:

forming an optical waveguide path inside a surface of an electro-optical crystal substrate;

forming a buffer layer above said optical waveguide path; and forming a driving electrode above said buffer layer directly or approximately over a portion of said optical waveguide path, for impressing an electric field so as to change a refractive index of said portion optical waveguide path;

wherein in the step of forming said buffer layer, providing a transparent dielectric material for said buffer layer, said transparent dielectric material being composed of a compound which includes silicon oxide and an oxide of at least one further element, and wherein said at least one further element is selected from the group consisting of the metal elements of the Groups III to VIII, Ib and IIb of the Periodic Table.

8. A method for forming an optical waveguide device, comprising the steps of:

forming an optical waveguide path inside a surface of an electro-optical crystal substrate;

forming a buffer layer above said optical waveguide path; and forming a driving electrode above said buffer layer directly or approximately over a portion of said optical waveguide path, for impressing an electric field so as to change refractive index of said portion optical waveguide path;

wherein in the step of forming said buffer layer, providing a transparent dielectric material for said buffer layer, said transparent dielectric material being composed of a mixture which includes silicon oxide and an oxide of at least one further element, and wherein said at least one further element is selected from the group consisting of the metal elements of the Groups III to VIII, Ib and IIb of the Periodic Table.

9. A method of forming an optical waveguide device according to claim 7 or 8, wherein said buffer layer is formed by multi-source deposition, or multi electrode sputtering using an apparatus equipped with a plurality of electron beam sources or sputter targets for simultaneously effecting vacuum deposition or sputtering of silicon oxide and an oxide of other metals or semiconductors.

10. A method of forming an optical waveguide device according to claim 9, further including the step of rotating or reciprocating an optical substrate, and forming a film on said optical substrate in an ultra-multiple-layered structure from a plurality of said sources or targets.

11. A method of forming an optical waveguide device according to claim 7 or 8, wherein a target is formed placing an oxide of other metals or semiconductors on a silicon oxide substrate, or by forming a hole and then burying said oxide, and said buffer layer is formed by electron beam deposition, sputtering, and so forth, by using said target.

12. A method of forming an optical waveguide device according to claim 7 or 8, wherein said buffer layer is formed while a part of the whole of said electron beam sources or said sputter targets are in the state of a metal or a semiconductor, and said buffer layer is formed in the state of an oxide while vacuum deposition or sputtering is carried out in an oxygen-containing reactive atmosphere.

13. A method for forming an optical waveguide device according to claim 7 or 8, wherein a target is formed by mixing silicon oxide with an oxide of other metals or semiconductors, and then sintering the mixture, and said buffer layer is formed by electron beam deposition, sputtering, and so forth, by using said target.

* * * * *